Aug. 22, 1967 R. D. BECK 3,336,946
WATER LEVEL CONTROL AND PARTS THEREFOR OR THE LIKE
Filed Jan. 25, 1965 2 Sheets-Sheet 1
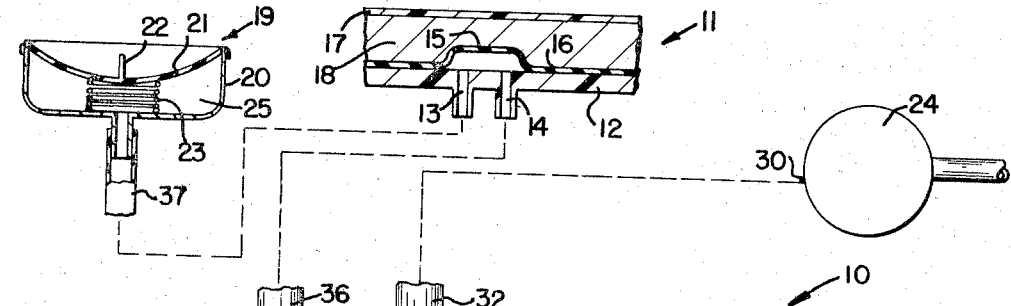
FIG.-1
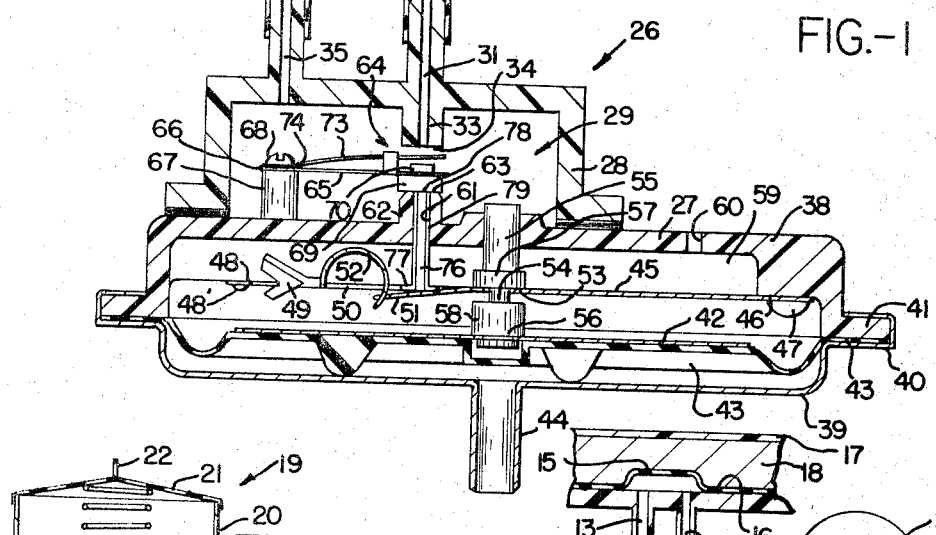
FIG.-2
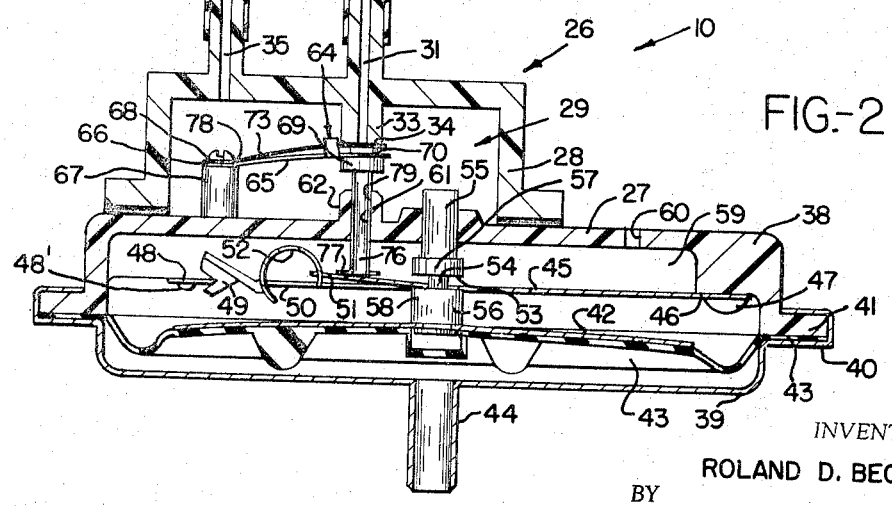
INVENTOR.
ROLAND D. BECK
BY
Caudn & Caudn
HIS ATTORNEYS INVENTOR.
ROLAND D. BECK
BY
*Caudn & Caudn*
HIS ATTORNEYS

United States Patent Office 3,336,946
Patented Aug. 22, 1967

3,336,946
WATER LEVEL CONTROL AND PARTS THEREFOR OR THE LIKE
Roland D. Beck, Anaheim, Calif., assignor to Robertshaw Controls Company, Richmond, Va., a corporation of Delaware
Filed Jan. 25, 1965, Ser. No. 427,715
17 Claims. (Cl. 137—625.66)

This invention relates to an improved water level control for a domestic washing machine or the like as well as to improved parts for such a water level control or the like.

For example, the water level control of this invention can readily be utilized in a pneumatic system for controlling the operation of a domestic washing machine or the like, the control having means for preventing the actuation of a pneumatically controlled actuator until the level in the domestic washing machine tub or the like has reached a predetermined level.

In particular, this invention provides a water level control wherein various passageways in the control are opened and closed by improved valve means in response to the water level sensed by the control of this invention.

Accordingly, it is an object of this invention to provide an improved water level control having one or more of the novel features set forth above or hereinafter shown or described.

Another object of this invention is to provide an improved part for such a control or the like.

Other objects, uses and advantages of this invention are apparent from a reading of this description which proceeds with reference to the accompanying drawings forming a part thereof and wherein:

FIGURE 1 is a schematic cross-sectional view illustrating the improved control device of this invention.

FIGURE 2 is a view similar to FIGURE 1 and illustrates the control device in another operating position thereof.

Figure 3:
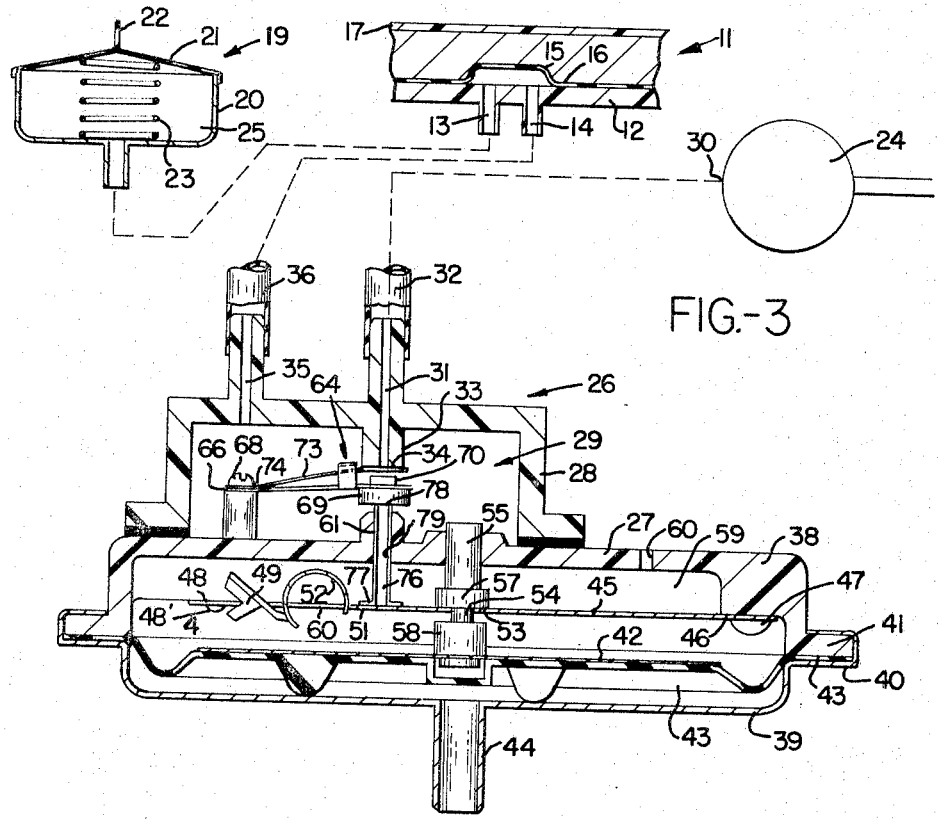
FIGURE 3 is a view similar to FIGURE 1 and illustrates the control device in still another operating position thereof.

While the various parts of this invention are hereinafter described and illustrated as being particularly adaptable to provide a water level control device for a domestic washing machine or the like, it is to be understood that the various parts of this invention can be utilized singly or in any combination thereof to provide a control device for other apparatus as desired.

Therefore, this invention is not to be limited to only the embodiment illustrated in the drawings, because the drawings are merely utilized to illustrate one of the wide variety of uses of this invention.

Referring now to FIGURE 1, an improved control system of this invention is generally indicated by the reference numeral 10 and it is readily adapted to control the water level in a tub of a domestic washing machine or the like.

The control system 10 includes a pneumatic programmer means 11 comprising a stationary reading head 12 having a pair of ports 13 and 14 formed therein and adapted to be interconnected together by a raised blister 15 formed on a flexible programmer member 16 movable in unison with a rigid back-up member 17 and separated therefrom by a porous compressible means 18.

The flexible program member 16 has a plurality of raised blisters 15 formed therein so that as the same is moved relative to the stationary reading head 12, the raised blisters 15 are adapted to interconnect together two or more ports so as to cause actuation of pneumatically controlled actuators which control the operation of the domestic washing machine or the like.

For example, a pneumatically operated actuator 19 can be provided and comprises a cup-shaped housing 20 having the open and end thereof closed by a flexible diaphragm 21 having an actuating post 22 for actuating the desired structure, such as an electrical switch or the like. The flexible diaphragm 21 is normally urged outwardly to the position illustrated in FIGURE 2 by a compression spring 23. However, when a vacuum source, such as a vacuum pump 24, is interconnected to the chamber 25 of the actuator 19 in the manner illustrated in FIGURE 1, the diaphragm 21 is pulled downwardly to cause actuation of the desired device.

For example, when the actuator 19 illustrated in FIGURE 1 is in its actuated position as illustrated in FIGURE 1, the same can control a water valve which will direct water into the washing machine tub until the actuator 19 is in its deactuated position as illustrated in FIGURE 2.

In order to make sure that the actuator 19 is deactuated when the water level in the washing machine tub has reached the desired level, a water level control 26 of this invention is provided and comprises a pair of housing means 27 and 28 suitably secured together with the housing means 27 and 28 cooperating together to define a chamber 29. The chamber 29 is adapted to be interconnected to the inlet side 30 of the vacuum pump 24 by a passage means 31, the passage means 31 being interconnected to the inlet side 30 of the pump 24 by flexible conduit means 32. The passage means 31 extends through an embossment 33 projecting into the chamber 29 of the water level control 26 and defines a valve seat 34 for the passage means 31.

Another passage means 35 is formed in the housing means 28 and is adapted to interconnect the chamber 29 with the port 14 of the program means 11 by a flexible conduit 36. The other port means 13 of the reading head 12 is interconnected to the chamber 25 of the pneumatically operated actuator 19 by a flexible conduit means 37.

The housing 27 includes two cup-shaped members 38 and 39 suitably interconnected together by having a flange 40 of the member 39 bent around a flange 41 of the member 38, a flexible diaphragm 42 having the outer periphery 43 thereof sandwiched between the flanges 40 and 41 of the members 39 and 38 in the manner illustrated in FIGURE 1 to define a chamber 43.

The chamber 43 of the water level control 26 is adapted to be interconnected to a water filled tube by a nipple means 44 whereby when the water level in the tub of the domestic washing machine or the like reaches a preselected level, pressure in the chamber 43 moves the flexible diaphragm 42 from the position illustrated in FIGURE 1 to the position illustrated in FIGURE 2 to cause deactuation of the actuator 19 in a manner hereinafter described so that the flow of water into the tub will cease.

A flexible snap acting blade means 45 is carried by the water level control 26 and has one end 46 thereof fixed to the housing part 38 by rivet means 47 and the other end 48 thereof secured to the housing part 38 by rivet means 48'. The flexible blade 45 has a slot 50 passing therethrough and defining a tang 51 operatively interconnected to the end 48 thereof by a rolling spring 52 and a fulcrum member 49.

The tab 51 has a slot 53 therein which receives a reduced portion 54 of an actuating post 55 interconnected to the flexible diaphragm 42 at the end 56 thereof. The reduced portion 54 of the post 55 is defined between enlarged cylindrical portions 57 and 58 which are adapted to respectively engage the tang 51 in a manner hereinafter described.

The flexible diaphragm 42 cooperates with the housing part 38 to define a chamber 59 interconnected to the atmosphere by suitable aperture means 60. The chamber 59 is also adapted to be interconnected to the chamber 29 by a passage means 61 formed in a vent port embossment 62 projecting into the chamber 29 and having a vent port valve seat 63 for a purpose hereinafter described.

A valve means 64 is disposed in the chamber 29 and comprises a flexible spring blade 65 having one end 66 secured to a stationary post 67 by fastening means 68, the other end of the spring blade 65 carrying rigid means which includes a button 69 on one side thereof and a smaller button 70 on the other side thereof.

The spring blade 65 is so constructed and arranged that the same has the normal tendency to be disposed in the position illustrated in FIGURE 1 whereby the rigid member 69 seals closed the vent port valve seat 63.

Figure 4:
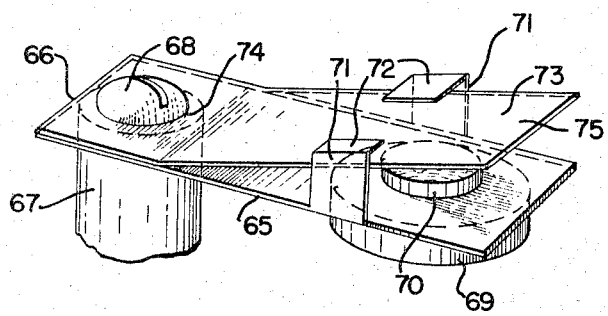
FIGURE 4 is a fragmentary perspective view illustrating the valve means of the control device of FIGURE 1.

The spring blade 65 as illustrated in FIGURES 1 and 4 has a pair of tangs 71 extending upwardly therefrom and having inwardly bent ends 72 for a purpose now to be described.

A thin flexible tape-like member 73 is provided and has one end 74 disposed in stacked relation with the end 66 of the spring blade 65 and secured to the post 67 by the fastening means 68. The flexible tape-like member 73 is disposed beneath the bent over ends 72 of the tangs 71 of the spring blade 65 and has an end 75 adapted to open and close the passage valve seat 34 for a purpose hereinafter described.

While the tape-like member 73 can be formed of any suitable material, the same can be formed of the resin sold under the trademark "Mylar," manufactured by the Dupont de Nemours Corporation of Wilmington, Delaware.

A stem member 76 is provided and is adapted to project through the vent port 61 in the manner illustrated in FIGURE 1 whereby an enlarged end 77 thereof is adapted to abut or be fastened to tang 51 of the blade 45 and the other end 78 thereof is adapted to be engageable with the rigid member 69.

Therefore, it can be seen that the water level control 26 of this invention is relatively simple in the parts thereof and can be economically manufactured to accomplish the desired function in a manner now to be described.

When the program means 11 has the flexible sheet 16 thereof advanced by a suitable timer motor or the like into the position illustrated in FIGURE 1 wherein no water is in the washing machine tube, it can be seen that the flexible diaphragm 42 is pulled to its down position because the valve seat 34 is opened and the vent port 63 is closed whereby the passage means 31 and 35 are interconnected together by means of the chamber 29 of the water level control 26. Thus, since the blister 15 is bridging the ports 14 and 13 in the reading head 12, the vacuum pump 24 is interconnected to the actuator 19 to evacuate the chamber 25 thereof and pull the diaphragm 21 downwardly so that the actuated actuator 19 can open a water valve and direct water into the washing machine tub.

As the water in the washing machine tub begins to increase, the pressure in the chamber 43 of the water level control 26 increases until water level in the tub has reached a predetermined level whereby the diaphragm 42 has moved upwardly in the manner illustrated in FIGURE 2 to cause the rolling spring 52 to snap the tang 51 upwardly to the position illustrated in FIGURE 2 whereby the stem member 76 moves therewith and causes the blade 65 to move upwardly and compress the end 75 of the tape-like member 73 against the valve seat 64 to completely close the passage means 31 from the chamber 29 while simultaneously opening the vent port seat 63.

Since the valve stem 76 has grooves 79 formed therein, the chamber 29 of the water level control 26 is now interconnected to the atmosphere by means of the chamber 59 and aperture 60 whereby the actuator 19 is adapted to be returned to its normal position as the vacuum pump 24 is disconnected from the chamber 25 thereof by the closed valve seat 34. Thus, the flow of water into the washing machine is terminated and the actuator 19 can cause the timer motor to advance the program means 11 out of its water filling position.

Subsequently, the program member 11 operates a drain pump whereby the water in the washing machine tub is drained therefrom.

As the water level goes down in the washing machine tub, the pressure in the chamber 43 decreases whereby the tang 51 tends to slightly move downwardly under the force of the spring blade 65 in the manner illustrated in FIGURE 3. However, the tape-like member 73 remains in sealed condition against the valve seat 34 because the vacuum pump 24 creates a pressure differential across the same so that the air pressure in the chamber 29 holds the tape-like member 73 against the seat 34.

The downward movement of the spring blade 55 relative to the tape-like member 37 is provided by the lost motion means connection between the tangs 71 and the flexible member 73.

However, when the tang 51 has been moved downwardly a predetermined distance, the rolling spring 52 rolls over and snaps the tang 51 downwardly to the position illustrated in FIGURE 1 whereby the tangs 71 of the blade 65 pull the tape-like member 73 downwardly therewith and rapidly breaks the seal at the seat 34 while closing the vent port seat 63 with the rigid member 69 in the manner illustrated in FIGURE 1.

Thus, it can be seen that no leakage occurs at the closed passage seat 34 until the tang 51 has completely snapped over center to the position illustrated in FIGURE 1.

Accordingly, this invention not only provides an improved water level control having many novel features as set forth above, but also this invention provides improved parts for such a water level control or the like.

While the form of the invention now preferred has been disclosed as required by the statutes, other forms may be used, all coming within the scope of the claims which follow.

What is claimed is:

1. In combination, a housing defining a chamber having a first passage and a second passage, a flexible blade mounted in said chamber and carrying a rigid member on a free end thereof for opening and closing one of said passages, a flexible tape-like member having one end secured to said blade and having a free end for opening and closing the other of said passages, and means for moving said blade.

2. A combination as set forth in claim 1 wherein said blade has a lost-motion means connecting said tape-like member to said blade.

3. A combination as set forth in claim 1 wherein said last-named means includes a snap-acting mechanism.

4. In a water level control having a movable member moved in response to water level, the improvement comprising a housing means defining a chamber having a first passage to be connected to a pneumatically controlled actuator and a second passage to be connected to a pneumatic source, said housing having a vent port connecting said chamber to the atmosphere and a valve means for opening and closing one of said passages while closing and opening said vent port, said valve means being operatively interconnected to said movable member, said valve means including a flexible tape-like member having a free end for opening and closing said one passage and a leaf spring means having a free end for closing and opening said vent port, the other end of said tape-like member and said leaf spring means being secured together.

5. In a water level control as set forth in claim 4, said leaf spring means including a rigid member being carried by a flexible blade, said flexible blade having lost motion means connecting said blade to said flexible tape-like member.

6. In a water level control having a flexible diaphragm movable in response to water level, the improvement comprising a housing defining a chamber having a first passage to be connected to a pneumatically controlled actuator and a second passage to be connected to a pneumatic source, said housing having a vent port connecting said chamber to the atmosphere, a valve means for opening and closing one of said passages while closing and opening said vent port, and snap-acting means interconnecting said diaphragm to said valve means, said valve means including a flexible tape-like member having a free end for opening and closing said one passage and a leaf spring means having a free end for closing and opening said vent ports, the other ends of said tape-like member and said leaf spring means being secured together.

7. In a water level control as set forth in claim 6, said leaf spring means including a rigid member being carried by a flexible blade, said flexible blade having lost-motion means connecting said blade to said flexible tape-like member.

8. In a water level control having a flexible diaphragm movable in response to water level, the improvement comprising a housing defining a chamber having a first passage to be connected to a pneumatically controlled actuator and a second passage to be connected to a pneumatic source, said housing having a vent port connecting said chamber to the atmosphere, a flexible blade having one end secured to said housing and having a rigid member on the free end thereof for opening and closing said vent port, a flexible tape-like member having one end secured to said blade and having a free end for opening and closing one of said passages, and means operatively interconnecting said blade to said diaphragm whereby said diaphragm controls the opening and closing of said one passage and said vent port.

9. In a water level control having a flexible diaphargm movable in response to water level, the improvement comprising a housing defining a chamber having a first passage to be connected to a pneumatically controlled actuator and a second passage to be connected to a pneumatic source, said housing having vent port connecting said chamber to the atmosphere, a flexible blade carried by said housing and having a rigid member for opening and closing said vent port, a flexible tape-like member carried by said blade for opening and closing one of said passages, a stem member projecting through said vent port and being engageable with said rigid member, and snap-active means operatively interconnecting said diaphragm with said stem member whereby said diaphragm controls the opening and closing of said one passage and said vent port.

10. In a water level control as set forth in claim 9, said flexible blade having tangs bent over said flexible tape-like member to provide lost motion means therebetween.

11. In a water level control as set forth in claim 9, said rigid member having means to press said flexible tape-like member in its passage closing position.

12. In a water level control as set forth in claim 9, one end of said tape-like member and one end of said flexible blade are secured to said housing in stacked relation.

13. In combination, a housing defining a chamber having a first passage and a second passage, a flexible blade mounted in said chamber and carrying a rigid member for opening and closing one of said passages, a flexible tape-like member carried by said blade for opening and closing the other of said passages, and mean for moving said blade, said last-named means including a stem member projecting through said one passage and being engageable with said rigid member.

14. In combination, a housing defining a chamber having a first passage and a second passage, a flexible blade mounted in said chamber and carrying a rigid member for opening and closing one of said passages, a flexible tape-like member carried by said blade for opening and closing the other of said passages, and mean for moving said blade, one end of said tape-like member and one end of said blade being secured to said housing in stacked relation.

15. In a water level control having a flexible diaphragm movable in response to water level, the improvement comprising a housing defining a chamber having a first passage to be connected to a pneumatically controlled actuator and a second passage to be connected to a pneumatic source, said housing having a vent port connecting said chamber to the atmosphere, a flexible blade carried by said housing and having a rigid member for opening and closing said vent port, a flexible tape-like member carried by said blade for opening and closing one of said passages, and means operatively interconnecting said blade to said diaphragm whereby said diaphragm controls the opening and closing of said one passage and said vent port, said flexible blade having tangs bent over said flexible tape-like member to provide lost motion means therebetween.

16. In a water level control having a flexible diaphragm movable in response to water level, the improvement comprising a housing defining a chamber having a first passage to be connected to a pneumatically controlled actuator and a second passage to be connected to a pneumatic source, said housing having a vent port connecting said chamber to the atmosphere, a flexible blade carried by said housing and having a rigid member for opening and closing said vent port, a flexible tape-like member carried by said blade for opening and closing one of said passages, and means operatively interconnecting said blade to said diaphragm whereby said diaphragm controls the opening and closing of said one passage and said vent port, said rigid member having means to press said flexible tape-like member in its passage closing position.

17. In a water level control having a flexible diaphragm movable in response to water level, the improvement comprising a housing defining a chamber having a first passage to be connected to a pneumatically controlled actuator and a second passage to be connected to a pneumatic source, said housing having a vent port connecting said chamber to the atmosphere, a flexible blade carried by said housing and having a rigid member for opening and closing said vent port, a flexible tape-like member carried by said blade for opening and closing one of said passages, and means operatively interconnecting said blade to said diaphragm whereby said diaphragm controls the opening and closing of said one passage and said vent port, one end of said tape-like member and one end of said flexible blade being secured to said housing in stacked relation.

References Cited

UNITED STATES PATENTS 2,861,591  11/1958  Hertel _____ 251—75 X
3,030,778  4/1962  Taylor _____ 137—625.66
3,237,646  3/1966  Houser et al. _____ 251—75 X M. CARY NELSON, *Primary Examiner.*

R. J. MILLER, *Assistant Examiner.*